US006699813B2

(12) United States Patent
Luo et al.

(10) Patent No.: US 6,699,813 B2
(45) Date of Patent: Mar. 2, 2004

(54) LANTHANIDE-BASED CATALYST COMPOSITION FOR THE MANUFACTURE OF POLYDIENES

(75) Inventors: Steven Luo, Akron, OH (US); Yoichi Ozawa, Kodaira (JP); Koji Masaki, Fairlawn, OH (US); David Lawson, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/287,205

(22) Filed: Nov. 4, 2002

(65) Prior Publication Data

US 2003/0176276 A1 Sep. 18, 2003

Related U.S. Application Data

(60) Provisional application No. 60/337,728, filed on Nov. 7, 2001.

(51) Int. Cl.$^7$ .............................. B01D 31/00; C07C 2/08; C08F 4/44
(52) U.S. Cl. ..................... 502/119; 502/103; 502/114; 502/115; 502/118; 502/129; 502/132; 502/133; 502/134; 502/150; 502/152; 502/153; 502/154; 502/155; 502/162; 585/10; 585/12; 585/506; 585/507; 526/96; 526/97; 526/98; 526/99; 526/103; 526/117; 526/135; 526/154; 526/172; 526/943
(58) Field of Search ................... 502/103, 118, 502/114, 115, 119, 129, 132, 133, 134, 150, 152, 153, 154, 155, 162; 585/10, 12, 506, 507; 526/96, 97, 98, 99, 103, 117, 135, 154, 172, 943

(56) References Cited

U.S. PATENT DOCUMENTS

| | | |
|---|---|---|
| 3,297,667 A | 1/1967 | von Dohlen et al. |
| 3,541,063 A | 11/1970 | Throckmorton et al. |
| 3,794,604 A | 2/1974 | Throckmorton et al. |
| 4,242,232 A | 12/1980 | Sylvester et al. |
| 4,260,707 A | 4/1981 | Sylvester et al. ............ 526/114 |
| 4,429,089 A | 1/1984 | Pedretti et al. ............. 526/153 |
| 4,575,538 A | 3/1986 | Hsieh et al. ................ 525/244 |
| 5,585,440 A | 12/1996 | Yamada et al. ............. 525/193 |
| 6,001,478 A | 12/1999 | Apecetche et al. ......... 428/407 |
| 6,114,483 A | 9/2000 | Coughlin et al. ........... 526/172 |
| 6,136,919 A | 10/2000 | Zimmer et al. ............. 524/856 |
| 6,180,738 B1 | 1/2001 | Wang et al. ................ 526/200 |
| 6,191,226 B1 | 2/2001 | Matsuda et al. ............ 525/236 |
| 6,239,063 B1 | 5/2001 | Bogdan ...................... 502/325 |
| 6,255,420 B1 | 7/2001 | Dietz, III et al. ........... 526/185 |
| 6,262,196 B1 | 7/2001 | Mecking ..................... 526/114 |
| 6,437,205 B1 * | 8/2002 | Miller et al. ................. 585/12 |
| 6,451,934 B1 * | 9/2002 | Jang et al. .................. 526/117 |

OTHER PUBLICATIONS

Z. Shen et al., J. of Polymer Science: Polymer Chem. Edition, vol. 18; pp. 3345–3357 (1980).

Hsieh et al., Rubber Chemistry and Technology, vol. 58. pp. 117–145 (1985).

* cited by examiner

*Primary Examiner*—Elizabeth Wood
(74) *Attorney, Agent, or Firm*—Arthur M. Reginelli

(57) ABSTRACT

A catalyst composition that is the combination of or the reaction product of ingredients comprising (a) an lanthanide compound, (b) an alkylating agent, (c) a nickel-containing compound, and optionally (d) a halogen-containing compound, with the proviso that the halogen-containing compound must be present where none of the lanthanide compound, the alkylating agent, and the nickel-containing compound contain a labile halogen atom.

30 Claims, No Drawings

LANTHANIDE-BASED CATALYST COMPOSITION FOR THE MANUFACTURE OF POLYDIENES

This application gains priority from U.S. patent application Ser. No. 60/337,728, filed on Nov. 7, 2001.

FIELD OF THE INVENTION

The present invention relates to a catalyst composition that is formed by combining a nickel-containing compound with a lanthanide-based catalyst composition.

BACKGROUND OF THE INVENTION

Catalyst systems based on lanthanide metals, in particular neodymium, are known to be useful for polymerizing conjugated diene monomers. These catalyst systems are advantageously more active in aliphatic solvents, which are environmentally preferred, than in aromatic solvents. They are also often highly stereospecific and can produce cis-1,4-polydienes or trans-1,4-polydienes depending on the catalyst compositions. For example, lanthanide-based catalyst systems including a neodymium compound, an alkylating agent, and a source of halogen are particularly useful for producing cis-1,4-polydienes from various conjugated diene monomers such as 1,3-butadiene, isoprene, and 1,3-pentadiene. These catalyst systems are also capable of copolymerizing different types of conjugated diene monomers to give stereoregular cis-1,4-copolymer.

The cis-1,4-polydienes produced with a lanthanide-based catalyst have a linear backbone structure and exhibit good green strength and excellent viscoelastic properties. The linear backbone structure is believed to improve the tensile properties and abrasion and fatigue resistance, and to reduce hysteresis loss of rubber compounds. Therefore, these cis-1,4-polydienes are particularly suitable for use in tire components such as sidewall and tread.

Low molecular weight polydienes, such as low molecular weight cis-1,4-polydienes, made with lanthanide-based catalysts are also useful in rubber compounds. They can be blended with high molecular weight cis-1,4-polybutadiene to improve a variety of properties such as fracture resistance, snow traction, wet traction, and rolling resistance. Therefore, there is a demand for low or moderately high molecular weigh polydienes.

The molecular weight of polydienes produced with lanthanide-based catalysts can be controlled by varying the amount of catalyst used or adjusting the amounts of co-catalyst concentrations within the catalyst system. As a result, polydienes having a wide range of molecular weights can be produced with lanthanide-based catalyst systems. In general, the molecular weight of the polydienes can be reduced by increasing the catalyst and co-catalyst concentrations. Very high catalyst and co-catalyst concentrations, however, are required to produce low molecular weight polydienes such as liquid polydienes, which results in very high catalyst costs. In addition, the use of high catalyst levels necessitates the removal of catalyst residues from the polymer because these residues can cause subsequent adverse effects, such as retardation of the sulfur cure rate. The removal of catalyst residues from polymer (also referred to as de-ashing) is time-consuming and adds to manufacturing costs.

One approach to these problems is to use a molecular weight regulator without raising catalyst levels. Unfortunately, traditional molecular weight regulators such as α-olefins and nonconjugated dienes are ineffective in polymerizations that are catalyzed by lanthanide-based catalyst systems. In addition, the use of molecular weight regulators in Ziegler-Natta catalyst systems generally results in decrease in catalyst activity. Furthermore, the use of molecular weight regulators often adversely affects the polymer microstructure such as cis-1,4-linkage content.

Therefore, there is a need to develop a new method of regulating the molecular weight of polydienes produced with lanthanide-based catalyst systems. There is also a need to develop an improved lower-cost lanthanide-based catalyst composition for producing low molecular weight polydienes, in particular low molecular weight cis-1,4-polydienes.

SUMMARY OF THE INVENTION

It has been unexpectedly discovered that nickel compounds can be used as very efficient molecular weight regulators in conjugated diene polymerizations that are catalyzed by lanthanide-based catalyst systems.

The present invention provides a catalyst composition that is the combination of or the reaction product of ingredients comprising (a) an lanthanide compound, (b) an alkylating agent, (c) a nickel-containing compound, and optionally (d) a halogen-containing compound, with the proviso that the halogen-containing compound must be present where none of the lanthanide compound, the alkylating agent, and the nickel-containing compound contain a labile halogen atom.

The present invention also includes a process for lowering the molecular weight of polydienes prepared with a lanthanide-based catalyst system, the process comprising polymerizing conjugated dienes with a lanthanide-based catalyst system that is formed by combining (a) a lanthanide compound, (b) an alkylating agent, (c) a nickel-containing compound, and optionally (d) a halogen-containing compound, with the proviso that the halogen-containing compound must be present where none of the lanthanide compound, the alkylating agent, and the nickel-containing compound contain a labile halogen atom.

The present invention further includes a process for forming conjugated diene polymers comprising the step of polymerizing conjugated diene monomers in the presence of a catalytically effective amount of a catalyst composition formed by combining (a) an lanthanide compound, (b) an alkylating agent, (c) a nickel-containing compound, and optionally (d) a halogen-containing compound, with the proviso that the halogen-containing compound must be present where none of the lanthanide compound, the alkylating agent, and the nickel-containing compound contain a labile halogen atom.

The addition of one or more nickel-containing compounds to lanthanide-based catalyst compositions for polymerizing cis-1,4-polydienes advantageously provides a method by which the molecular weights of the resulting polydienes can be easily regulated without significantly deteriorating catalyst activity and polymer microstructure. As a result, low molecular weight polydienes can be produced in high yields with low catalyst levels after relatively short polymerization times.

DETAILED DESCRIPTION OF ILLUSTRATIVE EMBODIMENTS

This invention is directed toward a method of regulating the molecular weights of polydienes by using a lanthanide-based composition that is modified with a nickel-containing compound. Various types of lanthanide-based compositions can be employed to catalyze the polymerization of dienes to produce polydienes. One type of lanthanide-based composition comprises a lanthanide compound, an alkylating agent, and a halogen-containing compound. When the lanthanide compound or the alkylating agent contain a halogen atom, the halogen-containing compound is optional. Another type of lanthanide-based composition comprises a lanthanide compound and an aluminoxane. Still another type of lanthanide-based composition comprises a lanthanide compound, an alkylating agent, and a non-coordinating anion or non-coordinating anion precursor.

In one embodiment, the catalyst composition is formed by combining (a) a lanthanide compound, (b) an alkylating agent, (c) a nickel-containing compound, and (d) a halogen-containing compound. Where the lanthanide compound, alkylating agent, or nickel-containing compound contains a labile halogen atom, the need for an additional compound containing a labile halogen atom is optional. Therefore, the catalyst system may be formed by combining (a) a lanthanide compound, (b) an alkylating agent, and (c) a nickel-containing compound, with the proviso that at least one of the lanthanide compound, the alkylating agent, or the nickel-containing compound includes a labile halogen atom. In addition to the catalyst ingredients (a), (b), (c), and (d), other organometallic compounds or Lewis bases can also be added, if desired.

Various lanthanide compounds or mixtures thereof can be employed as ingredient (a) of the catalyst composition. Preferably, these compounds are soluble in hydrocarbon solvents such as aromatic hydrocarbons, aliphatic hydrocarbons, or cycloaliphatic hydrocarbons. Hydrocarbon-insoluble lanthanide compounds, however, can be suspended in the polymerization medium to form the catalytically active species and are also useful.

Lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Because neodymium compounds are most advantageously employed, further discussion will focus on neodymium compounds, although those skilled in the art will be able to select similar compounds that are based upon other lanthanide metals.

Suitable neodymium carboxylates include neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate.

Suitable neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl)(2-ethylhexyl)phosphinate, and neodymium (2-ethylhexyl)(p-nonylphenyl)phosphinate.

Suitable neodymium carbamates include neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include neodymium methylxanthate, neodymium ethylxanthate, neodymium isopropylxanthate, neodymium butylxanthate, and neodymium benzylxanthate.

Suitable neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can serve as both the lanthanide compound as well as the halogen-containing compound. A Lewis base such as tetrahydrofuran (THF) may be employed as an aid for solubilizing this class of neodymium compounds in inert organic solvents.

The term organolanthanide compound refers to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)3$, and $Ln(allyl)_2Cl$, where Ln represents a lanthanide atom, and R represents a hydrocarbyl group.

Various alkylating agents, or mixtures thereof, can be used as component (b) of the catalyst composition. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound.

The term "organoaluminum compound" refers to any aluminum compound containing at least one aluminum-carbon bond. Organoaluminum compounds that are soluble in a hydrocarbon solvent are preferred. Where the alkylating agent is an organoaluminum compound that includes a labile halogen atom, the organoaluminum compound can serve as both the alkylating agent and the halogen-containing compound.

A preferred class of organoaluminum compounds that can be utilized is represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Suitable organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis (carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. Trihydrocarbylaluminum, dihydrocarbylaluminum hydride, and hydrocarbylaluminum dihydride compounds are preferred.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n- butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis (octoate), isobutylaluminum bis (2-ethylhexanoate), methylaluminum bis (neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of suitable organoaluminum compounds is aluminoxanes. Aluminoxanes comprise oligomeric linear aluminoxanes that can be represented by the general formula:

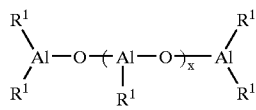

and oligomeric cyclic aluminoxanes that can be represented by the general formula:

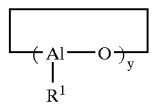

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one preferred embodiment, methyl aluminoxane and diisobutyl aluminum hydride are employed in combination.

The term organomagnesium compound refers to any magnesium compound that contains at least one magnesium-carbon bond. Organomagnesium compounds that are soluble in a hydrocarbon solvent are preferred. A preferred class of organomagnesium compounds that can be utilized is represented by the general formula $MgR^2_2$, where each $R^2$, which may be the same or different, is a mono-valent organic group, with the proviso that the group is attached to the magnesium atom via a carbon atom. Preferably, each $R^2$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Some specific examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium is particularly useful due to its availability and its solubility in aliphatic and cycloaliphatic hydrocarbon solvents.

Another class of organomagnesium compounds that can be utilized as ingredient (b) is represented by the general formula $R^3MgX$, where $R^3$ is a mono-valent organic group, with the proviso that the group is attached to the magnesium atom via a carbon atom, and X is a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and the halogen-containing compound. Preferably, $R^3$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. Preferably, X is a carboxylate group, an alkoxide group, or an aryloxide group, with each group preferably containing 1 to 20 carbon atoms.

Some suitable types of organomagnesium compounds that are represented by the general formula $R^3MgX$ include, but are not limited, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Some specific examples of suitable organomagnesium compounds that are represented by the general formula $R^3MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various nickel-containing compounds or mixtures thereof can be employed as ingredient (c) of the catalyst composition. Preferably, these nickel-containing compounds are soluble in hydrocarbon solvents such as aromatic hydrocarbons, aliphatic hydrocarbons, or cycloaliphatic hydrocarbons. Hydrocarbon-insoluble nickel-containing compounds, however, can be suspended in the polymerization medium to form the catalytically active species and are also useful.

The nickel atom in the nickel-containing compounds can be in various oxidation states including but not limited to the 0, +2, +3, and +4 oxidation states. Divalent nickel compounds, where the nickel atom is in the +2 oxidation state, are preferred. Suitable nickel-containing compounds include, but are not limited to, nickel carboxylates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Suitable nickel carboxylates include nickel formate, nickel acetate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Suitable nickel organophosphates include nickel dibutyl phosphate, nickel dipentyl phosphate, nickel dihexyl phosphate, nickel diheptyl phosphate, nickel dioctyl phosphate, nickel bis(1-methylheptyl) phosphate, nickel bis(2-ethylhexyl) phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl) phosphate, nickel (1-methylheptyl) (2-ethylhexyl) phosphate, and nickel (2-ethylhexyl) (p-nonylphenyl) phosphate.

Suitable nickel organophosphonates include nickel butyl phosphonate, nickel pentyl phosphonate, nickel hexyl phosphonate, nickel heptyl phosphonate, nickel octyl phosphonate, nickel (1-methylheptyl) phosphonate, nickel (2-ethylhexyl) phosphonate, nickel decyl phosphonate, nickel dodecyl phosphonate, nickel octadecyl phosphonate, nickel oleyl phosphonate, nickel phenyl phosphonate, nickel (p-nonylphenyl) phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl) (1-methylheptyl)phosphonate, nickel (2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl)phosphonate, nickel butyl (2-ethylhexyl) phosphonate, nickel (2-ethylhexyl) butylphosphonate, nickel (1-methylheptyl) (2-ethylhexyl)phosphonate, nickel (2-ethylhexyl) (1-methylheptyl)phosphonate, nickel (2-ethylhexyl) (p-nonylphenyl)phosphonate, and nickel (p-nonylphenyl) (2-ethylhexyl)phosphonate.

Suitable nickel organophosphinates include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel dodecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl)phosphinate, nickel (1-methylheptyl) (2-ethylhexyl)phosphinate, and nickel (2-ethylhexyl)(p-nonylphenyl)phosphinate.

Suitable nickel carbamates include nickel dimethylcarbamate, nickel diethylcarbamate, nickel diisopropylcarbamate, nickel dibutylcarbamate, and nickel dibenzylcarbamate.

Suitable nickel dithiocarbamates include nickel dimethyldithiocarbamate, nickel diethyldithiocarbamate, nickel diisopropyldithiocarbamate, nickel dibutyldithiocarbamate, and nickel dibenzyldithiocarbamate.

Suitable nickel xanthates include nickel methylxanthate, nickel ethylxanthate, nickel isopropylxanthate, nickel butylxanthate, and nickel benzylxanthate.

Suitable nickel β-diketonates include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Suitable nickel alkoxides or aryloxides include nickel methoxide, nickel ethoxide, nickel isopropoxide, nickel 2-ethylhexoxide, nickel phenoxide, nickel nonylphenoxide, and nickel naphthoxide.

Suitable nickel halides include nickel fluoride, nickel chloride, nickel bromide, and nickel iodide. Suitable nickel pseudo-halides include nickel cyanide, nickel cyanate, nickel thiocyanate, nickel azide, and nickel ferrocyanide. Suitable nickel oxyhalides include nickel oxyfluoride, nickel oxychloride and nickel oxybromide. Where nickel halides, nickel oxyhalides, or other nickel compounds containing labile halogen atoms are employed, the nickel-containing compound can serve as both a molecular weight regulator as well as the halogen-containing compound. A Lewis base such as an alcohol can be used as a solubility aid for this class of compounds.

The term organonickel compound refers to any nickel compound containing at least one nickel-carbon bond. Suitable organonickel compounds include bis(cyclopentadienyl)nickel (also called nickelocene), bis(pentamethylcyclopentadienyl)nickel (also called decamethylnickelocene), bis(tetramethylcyclopentadienyl)nickel, bis(ethylcyclopentadienyl)nickel, bis(isopropylcyclopentadienyl)nickel, bis(pentadienyl)nickel, bis(2,4-dimethylpentadienyl)nickel, (cyclopentadienyl)(pentadienyl)nickel, bis(1,5-cyclooctadiene)nickel, bis(allyl)nickel, bis(methallyl)nickel, and bis(crotyl)nickel.

Various compounds, or mixtures thereof, that contain one or more labile halogen atoms can be employed as ingredient (d) of the catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in a hydrocarbon solvent are preferred. Hydrocarbon-insoluble halogen-containing compounds, however, can be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

Suitable elemental halogens include fluorine, chlorine, bromine, and iodine. Some specific examples of suitable mixed halogens include iodine monochloride, iodine monobromide, iodine trichloride, and iodine pentafluoride.

Suitable hydrogen halides include hydrogen fluoride, hydrogen chloride, hydrogen bromide, and hydrogen iodide.

Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

The catalyst composition of this invention has very high catalytic activity for polymerizing conjugated dienes into stereospecific polydienes over a wide range of catalyst concentrations and catalyst ingredient ratios. The polymers having the most desirable properties, however, are obtained within a narrower range of catalyst concentrations and catalyst ingredient ratios. Further, it is believed that the catalyst ingredients (a), (b), (c), and (d) may interact to form an active catalyst species. Accordingly, the optimum concentration for any one catalyst ingredient is dependent upon the concentrations of the other catalyst ingredients. The molar ratio of the nickel-containing compound to the lanthanide compound (Ni/Ln) can be varied from about 0.001:1 to about 1:1, more preferably from about 0.005:1 to about 0.5:1, and even more preferably from about 0.01:1 to about 0.2:1. The molar ratio of the alkylating agent to the lanthanide compound (alkylating agent/Ln) can be varied from about 1:1 to about 200:1, more preferably from about 2:1 to about 100:1, and even more preferably from about 5:1 to about 50:1. The molar ratio of the halogen-containing compound to the lanthanide compound (halogen atom/Ln) can be varied from about 0.5:1 to about 20:1, more preferably from about 1:1 to about 10:1, and even more preferably from about 2:1 to about 6:1. The term molar ratio, as used herein, refers to the equivalent ratio of relevant components of the ingredients, e.g., equivalents of halogen atoms on the halogen-containing compound to lanthanide atoms on the lanthanide compound.

In another embodiment, the catalyst composition comprises (a) a lanthanide compound, (b) an aluminoxane, and (c) a nickel-containing compound, with the proviso that the molar ratio of the aluminoxane to the lanthanide compound (Al/Ln) is from about 50:1 to about 50,000:1, preferably from about 75:1 to about 30,000:1, and more preferably from about 100:1 to about 1,000:1, where the molar ratio refers to equivalents of aluminum atoms on the aluminoxane to equivalents of lanthanide atoms in the lanthanide compound. Useful lanthanide compounds, aluminoxanes, and nickel-containing compounds are described above.

In yet another embodiment, the catalyst composition of the present invention comprises (a) a lanthanide compound, (b) an alkylating agent, (c) a nickel-containing compound, and (d) a non-coordinating anion or non-coordinating anion precursor. Useful lanthanide compounds, alkylating agents, and nickel-containing compounds are described above. Useful molar ratios of non-coordinating anion or non-coordinating anion precursor to lanthanide compound (An/Ln) include from about 0.5:1 to about 20:1, preferably from about 0.75:1 to about 10:1, and more preferably from about 1:1 to about 6:1.

A non-coordinating anion is a sterically bulky anion that does not form coordinate bonds with, for example, the active center of a catalyst system, due to steric hindrance. Preferred non-coordinating anions include tetraarylborate anions. More specifically, preferred non-coordinating anions include fluorinated tetraarylborate anions. Ionic compounds containing non-coordinating anions are known in the art, and also include a counter cation such as a carbonium, ammonium, or phosphonium cation. Triarylcarbonium cations are preferred. A specific example of a preferred compound containing a non-coordinating anion that may be utilized as ingredient (d) of the catalyst composition of this embodiment is triphenylcarbonium tetrakis (pentafluoropheynyl)borate.

A non-coordinating anion precursor may also be used as ingredient (d) of this embodiment. A non-coordinating anion precursor is a substance that is able to form a non-coordinating anion under reaction conditions. Useful non-coordinating anion precursors include trialkyl boron compounds, $BR_3$, where R is a strong electron-withdrawing group, such as pentafluorophenyl group.

The catalyst composition is formed by combining or mixing the catalyst ingredients (a), (b), (c), and (d). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by using one of the following methods.

First, the catalyst composition may be formed in situ by adding the catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the alkylating agent is added first, followed by the lanthanide compound, followed by the nickel-containing compound, and then followed by the halogen-containing compound, if used, or by the non-coordinating anion or non-coordinating anion precursor.

Second, the catalyst ingredients may be pre-mixed outside the polymerization system at an appropriate temperature, which is generally from about –20° C. to about 80° C., and the resulting catalyst composition is then added to the monomer solution.

Third, the catalyst composition may be pre-formed in the presence of at least one conjugated diene monomer. That is, the catalyst ingredients are pre-mixed in the presence of a small amount of conjugated diene monomer at an appropriate temperature, which is generally from about –20° C. to about 80° C. The amount of conjugated diene monomer that is used for pre-forming the catalyst can range from about 1 to about 500 moles per mole, more preferably from about 5 to about 250 moles per mole, and even more preferably from about 10 to about 100 moles per mole of the lanthanide compound. The resulting catalyst composition is then added to the remainder of the conjugated diene monomer that is to be polymerized.

Fourth, the catalyst composition may be formed by using a two-stage procedure. The first stage involves combining the alkylating agent with the lanthanide compound in the absence of conjugated diene monomer or in the presence of a small amount of conjugated diene monomer at an appropriate temperature, which is generally from about –20° C. to about 80° C. In the second stage, the foregoing reaction mixture and the remaining catalyst components are charged in either a stepwise or simultaneous manner to the remainder of the conjugated diene monomer that is to be polymerized.

Fifth, the catalyst composition may be formed by using a different two-stage procedure. The first stage involves combining the alkylating agent with the lanthanide compound and the nickel-containing compound in the absence of conjugated diene monomer or in the presence of a small amount of conjugated diene monomer at an appropriate temperature, which is generally from about –20° C. to about 80° C. In the second stage, the foregoing reaction mixture and the halogen-containing compound, non-coordinating anion, or non-coordinating anion precursor are charged in either a stepwise or simultaneous manner to the remainder of the conjugated diene monomer that is to be polymerized.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The catalyst composition of this invention exhibits very high catalytic activity for polymerizing conjugated dienes into cis-1,4-polydienes. Although one preferred embodiment is directed toward the polymerization of 1,3-butadiene into cis-1,4-polybutadiene, other conjugated dienes can also be polymerized. Some specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The production of cis-1,4-polydiene is accomplished by polymerizing conjugated diene monomer in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the lanthanide compound used can be varied from about 0.01 to about 2 mmol, more preferably from about 0.02 to about 1 mmol, and even more preferably from about 0.05 to about 0.5 mmol per 100 g of conjugated diene monomer.

The polymerization is preferably carried out in an organic solvent as the diluent. In one embodiment, a solution polymerization system is employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized is in a condensed phase. Also, the catalyst ingredients are preferably solubilized or suspended within the organic solvent. In other words, the catalyst ingredients are preferably not impregnated onto a catalyst support.

In performing these polymerizations, an amount of organic solvent in addition to the amount of organic solvent that may be used in preparing the catalyst composition is preferably added to the polymerization system. The additional organic solvent may be the same as or different from the organic solvent used in preparing the catalyst composition. An organic solvent that is inert with respect to the catalyst composition employed to catalyze the polymerization is preferably selected. Exemplary hydrocarbon solvents have been set forth above. When a solvent is employed, the concentration of the monomer to be polymerized is not limited to a special range. Preferably, however, the concentration of the monomer present in the polymerization medium at the beginning of the polymerization should be in a range of from about 3% to about 80% by weight, more preferably from about 5% to about 50% by weight, and even more preferably from about 10% to about 30% by weight.

The polymerization of conjugated dienes may also be carried out by means of bulk polymerization, which refers to a polymerization environment where no solvents are employed. The bulk polymerization can be conducted either in a condensed liquid phase or in a gas phase.

The polymerization of conjugated dienes may be carried out as a batch process, a continuous process, or a semi-continuous process. In the semi-continuous process, monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof.

The polymers prepared by using the catalyst composition of this invention advantageously have some degree of pseudo-living characteristics. As a result, these polymers can be coupled or functionalized by reacting them with suitable coupling agents or functonalizing agents prior to or in lieu of terminating the polymer. Exemplary coupling and functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, among other places, International Application Nos. PCT/US00/30743, PCT/US00/30875, and PCT/US00/30743; U.S. Pat. Nos. 4,906,706, 4,990,573, 5,064,910, 5,567,784, 4,736,001, 4,699,960, and 5,844,050; Japanese Patent Application Nos. 05-051406A, 05-059103A, 10-306113A, and 11-035633A, which are incorporated herein by reference. These coupling and functionalizing agents can be reacted with the pseudo-living polymers by admixing them together. The amount of functionalizing agent that is used can vary. Preferably, from about 0.01 to about 200 moles, and more preferably from about 0.1 to about 150 moles, of functionalizing agent per mole of lanthanide compound should be employed.

An antioxidant such as 2,6-di-tert-butyl-4-methylphenol may be added along with, before, or after the addition of the terminator. The amount of the antioxidant employed is usually in the range of 0.2% to 1% by weight of the polymer product.

When the polymerization has been stopped, the cis-1,4-polydiene product can be recovered from the polymerization mixture by utilizing conventional procedures of desolventization and drying. For instance, the polymer may be isolated from the polymerization mixture by coagulating the polymerization mixture with an alcohol such as methanol, ethanol, or isopropanol, followed by filtration, or by steam distilling the solvent and the unreacted monomer, followed by filtration. The isolated polymer product is then dried to remove residual amounts of solvent and water. Alternatively, the polymer may be isolated from the polymerization mixture by directly drum drying the polymer cement.

The isolation, drying, and handling of low molecular weight polydiene (especially, liquid polydiene) by itself is generally difficult. Therefore, when a low molecular weigh polydiene is produced by polymerization, the resulting polymer cement is preferably blended with the cement of a high molecular weight polydiene, and the resultant cement blend is then worked up by using the conventional procedures of desolventization and drying, as described above.

Where 1,3-butadiene is polymerized, the number average molecular weight ($M_n$) of the cis-1,4-polybutadiene is advantageously from about 5,000 to about 150,000, more advantageously from about 10,000 to about 80,000, and even more advantageously from about 20,000 to about 50,000, as determined by using gel permeation chromatography (GPC) with polystyrene standards. The polydispersity of these polymers is preferably from about 1.5 to about 5.0, and more preferably from about 2.0 to about 4.0. A broad range of polymer molecular weights can be achieved by using the catalyst system of this invention with significantly less catalyst and co-catalyst levels than conventional catalyst that do not employ nickel-containing compounds.

The preferred cis-1,4-polydienes are low molecular weight polydienes. These low molecular weight polydienes are prepared with surprisingly low catalyst levels. For example, cis-1,4-polybutadiene having an $M_n$ of less than 50,000, advantageously less than 40,000, more advantageously less than 30,000, and even more advantageously less than 20,000 can be prepared by using less than 0.5 mmol, advantageously less than 0.4 mmol, more advantageously less than 0.3 mmol, and even more advantageously less than 0.2 mmol of lanthanide compound per 100 g of 1,3-butadiene monomer. In the absence of the nickel-containing compounds, preferably high levels of lanthanide compound would be required to produce these low molecular weight polymers.

The cis-1,4-polydienes prepared with the catalyst composition of this invention advantageously can have a cis-1,4-linkage content that is greater than about 60%, more advantageously greater than about 75%, still more advantageously greater than about 90%, and even more advantageously greater than about 95%. Also, these polymers may advantageously have a 1,2-linkage content that is less than about 7%, more advantageously less than 5%, still more advantageously less than 2%, and even more advantageously less than 1%. The cis-1,4- and 1,2-linkage content can be determined by infrared spectroscopy.

The high cis-1,4-polydienes produced with the catalyst composition of this invention has many uses. It can be blended into and concurred with various natural or synthetic rubbers in order to improve the properties thereof. For example, it can be incorporated into elastomers in order to improve tensile properties, abrasion and fatigue resistance, and to reduce hysteresis loss. Accordingly, the cis-1,4-polydienes, especially high cis-1,4-polybutadiene, is useful in rubber compositions that are useful for tire treads and tire sidewalls.

In order to demonstrate the practice of the present invention, the following examples have been prepared and tested. The examples should not, however, be viewed as limiting the scope of the invention. The claims will serve to define the invention.

EXAMPLES

Example 1 (Control)

An oven-dried 1-liter glass bottle was capped with a self-sealing rubber liner and a perforated metal cap. After the bottle was thoroughly purged with a stream of dry nitrogen, the bottle was charged with 125.6 g of hexanes and 231.5 g of a 1,3-butadiene/hexanes blend containing 21.6% by weight of 1,3-butadiene. The following catalyst ingredients were then charged into the bottle in the following order: (1) 2.55 mmol of triisobutylaluminum, (2) 0.085 mmol of neodymium(III) versatate, and (3) 0.128 mmol of ethylaluminum dichloride. The bottle was placed in a water bath maintained at 65° C. After 1 hour, the polymerization was terminated by addition of 3 mL of isopropanol containing 0.30 g of 2,6-di-tert-butyl-4-methylphenol. The resulting polymer cement was coagulated with 3 liters of isopropanol containing 0.5 g of 2,6-di-tert-butyl-4-methylphenol, and then drum-dried. The yield of the polymer was 48.0 g (96%).

The polymer had a Mooney viscosity of 48.6. The Mooney viscosity ($ML_{1+4}$) was determined at 100° C. with a Monsanto Mooney viscometer using a large rotor, a one-minute warm-up time, and a four-minute running time. As determined by gel permeation chromatography (GPC) that was calibrated by using polystyrene standards and Mark-Houwink constants for cis-polybutadiene, the polymer had a number average molecular weight ($M_n$) of 131,000, a weight average molecular weight ($M_w$) of 330,000, and a polydispersity index ($M_w/M_n$) of 2.5. The infrared spectroscopic analysis of the polymer indicated a cis-1,4-linkage content of 97.1%, a trans-1,4-linkage content of 2.3%, and a 1,2-linkage content of 0.7%. The monomer charge, the amounts of the catalyst ingredients, and the properties of the resulting cis-1,4-polybutadiene are summarized in Table I.

TABLE I

| Example No. | 1 | 2 | 3 | 4 | 5 |
|---|---|---|---|---|---|
| Hexanes (g) | 125.6 | 125.6 | 125.6 | 125.6 | 125.6 |
| 22.4% 1,3-butadiene/hexanes (g) | 231.5 | 231.5 | 231.5 | 231.5 | 231.5 |
| i-Bu$_3$Al (mmol) | 2.55 | 2.55 | 2.55 | 2.55 | 2.55 |
| Nd(versatate)$_3$ (mmol) | 0.085 | 0.085 | 0.085 | 0.085 | 0.085 |
| Ni(EHA)$_2$ (mmol) | 0 | 0.00085 | 0.00255 | 0.0051 | 0.0085 |
| EtAlCl$_2$ (mmol) | 0.128 | 0.128 | 0.128 | 0.128 | 0.128 |
| Nd/Al/Cl molar ratio | 1:30:3 | 1:30:3 | 1:30:3 | 1:30:3 | 1:30:3 |
| Ni/Nd molar ratio | 0 | 0.010 | 0.030 | 0.060 | 0.10 |
| Polymer yield (%) after 1 hr at 65° C. | 96 | 96 | 96 | 95 | 95 |
| Mooney viscosity ($ML_{1+4}$) | 48.6 | 38.1 | 28.1 | 19.0 | 16.9 |
| $M_n$ | 131,000 | 120,000 | 97,000 | 76,000 | 68,000 |
| $M_w$ | 330,000 | 282,000 | 246,000 | 210,000 | 206,000 |
| $M_w/M_n$ | 2.5 | 2.4 | 2.5 | 2.8 | 3.1 |
| Polymer microstructure: | | | | | |
| cis-1,4-linkage content (%) | 97.1 | 96.4 | 96.0 | 95.7 | 96.0 |
| trans-1,4-linkage content (%) | 2.3 | 3.0 | 3.3 | 3.6 | 3.3 |
| 1,2-linkage content (%) | 0.7 | 0.6 | 0.7 | 0.7 | 0.6 |

Examples 2–5

In Examples 2–5, the procedure in Example 1 was repeated except that various amounts of Ni(II) 2-ethylhexanoate were included as an additional ingredient of the catalyst composition. The catalyst ingredients were charged into the bottle in the following order: (1) triisobutylaluminum, (2) neodymium(III) versatate, (3) Ni(II) 2-ethylhexanoate, and (4) ethylaluminum dichloride. The molar ratio of the nickel compound to the neodymium compound was varied. The monomer charge, the amounts of the catalyst ingredients, and the properties of the resulting cis-1,4-polybutadiene are summarized in Table I.

The results described in Examples 1–5 show that small amounts of a nickel compound can effectively reduce the molecular weight of cis-1,4-polybutadiene without affecting the catalyst activity and polymer microstructure such as cis-1,4-linkage content.

Examples 6–9

In Examples 6–9, the procedures in Example 1–5 were repeated except that diisobutylaluminum hydride was substituted for triisobutylaluminum. The monomer charge, the amounts of the catalyst ingredients, and the properties of the resulting cis-1,4-polybutadiene are summarized in Table II.

TABLE II

|  | Example No. | | | |
| --- | --- | --- | --- | --- |
|  | 6 | 7 | 8 | 9 |
| Hexanes (g) | 125.6 | 125.6 | 125.6 | 125.6 |
| 22.4% 1,3-butadiene/hexanes (g) | 231.5 | 231.5 | 231.5 | 231.5 |
| i-Bu$_2$AlH (mmol) | 1.70 | 1.70 | 1.70 | 1.70 |
| Nd(versatate)$_3$ (mmol) | 0.085 | 0.085 | 0.085 | 0.085 |
| Ni(EHA)$_2$ (mmol) | 0 | 0.0017 | 0.0034 | 0.0051 |
| EtAlCl$_2$ (mmol) | 0.128 | 0.128 | 0.128 | 0.128 |
| Nd/Al/Cl molar ratio | 1:30:3 | 1:30:3 | 1:30:3 | 1:30:3 |
| Ni/Nd molar ratio | 0 | 0.020 | 0.040 | 0.060 |
| Polymer yield (%) after 1 hr at 65° C. | 97 | 96 | 97 | 96 |
| Mooney viscosity (ML$_{1+4}$) | 18.6 | 4.7 | — | — |
| M$_n$ | 62,657 | 38,842 | 33,036 | 31,500 |
| M$_w$ | 356,022 | 165,811 | 134,695 | 127,998 |
| M$_w$/M$_n$ | 5.7 | 4.3 | 4.1 | 4.1 |
| Polymer microstructure: | | | | |
| cis-1,4-linkage content (%) | 96.4 | 93.6 | 92.2 | 92.5 |
| trans-1,4-linkage content (%) | 2.6 | 5.6 | 6.9 | 6.6 |
| 1,2-linkage content (%) | 1.0 | 0.9 | 0.9 | 0.9 |

The Mooney viscosities of the polymer samples made in Examples 8 and 9 were too low to be measured.

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients consisting essentially of:
   (a) an lanthanide compound;
   (b) an alkylating agent;
   (c) a nickel-containing compound; and optionally
   (d) a halogen-containing compound that includes one or more labile halogen atoms, where each labile halogen atom, which may be the same or different, is a chlorine, bromine, or iodine atom, with the proviso that the halogen-containing compound must be present where none of the lanthanide compound, the alkylating agent, and the nickel-containing compound contain a labile halogen atom.

2. The composition of claim 1, where said nickel-containing compound is a nickel carboxylate, nickel organophosphate, nickel organophosphonate, nickel organophosphinate, nickel carbamate, nickel dithiocarbamate, nickel xanthate, nickel β-diketonate, nickel alkoxide or aryloxide, nickel halide, nickel pseudo-halide, nickel oxyhalide, organonickel compound, or mixture thereof.

3. The composition of claim 1, where the molar ratio of said nickel-containing compound to said lanthanide compound is 0.001:1 to about 1:1.

4. The composition of claim 1, where the molar ratio of said nickel-containing compound to said lanthanide compound is 0.005:1 to about 0.5:1.

5. The composition of claim 1, where said lanthanide compound is a neodymium carboxylate, neodymium organophosphate, neodymium organophosphonate, neodymium organophosphinate, neodymium carbamate, neodymium dithiocarbamate, neodymium xanthate, neodymium β-diketonate, neodymium alkoxide or aryloxide, neodymium halide, neodymium pseudo-halide, neodymium oxyhalide, organoneodymium compound, or mixture thereof.

6. The composition of claim 1, where said alkylating agent is an organoaluminum compound represented by the formula AlR$_n$X$_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

7. The composition of claim 1, where said halogen-containing compound includes elemental halogen, mixed halogen, hydrogen halide, organic halide, inorganic halide, metallic halide, organometallic halide, or mixtures thereof.

8. The composition of claim 1, where the molar ratio of said alkylating agent to said lanthanide compound is from about 1:1 to about 200:1, and the molar ratio of said halogen-containing compound to said lanthanide compound is from about 0.5:1 to about 20:1.

9. The composition of claim 1, where the molar ratio of said alkylating agent to said lanthanide compound is from about 2:1 to about 100:1, and the molar ratio of said halogen-containing compound to said lanthanide compound is from about 1:1 to about 10:1.

10. The composition of claim 1, where the lanthanide compound, the alkylating agent, the nickel-containing compound, and the optional halogen-containing compound are dissolved or suspended in an organic solvent.

11. A catalyst composition formed by a process comprising the step of combining ingredients consisting essentially of:
    (a) an lanthanide compound;
    (b) an alkylating agent;
    (c) a nickel-containing compound; and optionally
    (d) a halogen-containing compound that includes one or more labile halogen atoms, where each labile halogen atom, which may be the same or different, is a chlorine, bromine, or iodine atom, with the proviso that the halogen-containing compound must be present where none of the lanthanide compound, the alkylating agent, and the nickel-containing compound contain a labile halogen atom.

12. A process for lowering the molecular weight of polydienes prepared with a lanthanide-based catalyst system, said process comprising:
    polymerizing conjugated dienes with a lanthanide-based catalyst system that is formed by the ingredients consisting essentially of (a) a lanthanide compound, (b) an alkylating agent, (c) a nickel-containing compound, and optionally (d) a halogen-containing compound that includes one or more labile halogen atoms, where each labile halogen atom, which may be the same or different, is a chlorine, bromine, or iodine atom, with the proviso that the halogen-containing compound must be present where none of the lanthanide compound, the alkylating agent, and the nickel-containing compound contain a labile halogen atom.

13. The process of claim 12, where said conjugated dienes are in their condensed phase.

14. The process of claim 12, where the molar ratio of said nickel-containing compound to said lanthanide compound is from about 0.001:1 to about 1:1.

15. The process of claim 12, where said step of combining comprises combining said alkylating agent with said lanthanide compound to form a mixture, and subsequendy adding said nickel-containing compound and said halogen-containing compound to said mixture.

16. The process of claim 12, where said step of combining comprises combining said alkylating agent, said lanthanide compound, and said nickel-containing compound to form a mixture, and subsequendy adding said halogen-containing compound to said mixture.

17. The process of claim 12, where said nickel-containing compound is a nickel carboxylate, nickel organophosphate, nickel organophosphonate, nickel organophosphinate, nickel carbamate, nickel dithiocarbamate, nickel xanthate, nickel β-diketonate, nickel alkoxide or aryloxide, nickel halide, nickel pseudo-halide, nickel oxyhalide, organonickel compound, or mixture thereof.

18. The process of claim 12, where the molar ratio of said alkylating agent to said lanthanide compound is from about 1:1 to about 200:1, and the molar ratio of said halogen-containing compound to said lanthanide compound is from about 0.5:1 to about 20:1.

19. A process for forming conjugated diene polymers comprising the step of:
polymerizing conjugated diene monomers in the presence of a catalytically effective amount of a catalyst composition formed by combining the ingredients consisting essentially of:
(a) an lanthanide compound;
(b) an alkylating agent;
(c) a nickel-containing compound; and optionally
(d) a halogen-containing compound that includes one or more labile halogen atoms, where each labile halogen atom, which may be the same or different, is a chlorine, bromine, or iodine atom, with the proviso that the halogen-containing compound must be present where none of the lanthanide compound, the alkylating agent, and the nickel-containing compound contain a labile halogen atom.

20. The process of claim 19, where said conjugated diene monomers consist essentially of 1,3-butadiene, thereby forming cis-1,4-polybutadiene; where said catalytically effective amount includes from about 0.01 to about 2 mmol of lanthanide-containing compound per 100 g of monomer; and where said 1,3-butadiene is in its condensed phase.

21. The catalyst composition of claim 1, where said halogen-containing compound is elemental chlorine, elemental bromine, elemental iodine, hydrogen chloride, hydrogen bromide, hydrogen iodide, iodine monochioride, iodine monobromide, iodine trichioride, t-butyl chloride, t-butyl bromides, allyl chloride, allyl bromide, benzyl chloride, benzyl bromide, chioro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichiorosilane, trimethylchlorosilane, benzoyl chloride, benzoyl bromide, propionyl chloride, propionyl bromide, methyl chioroformate, methyl bromoformate, phosphorus trichioride, phosphorus tribromide, phosphorus pentachioride, phosphorus oxychloride, phosphorus oxybromide, boron trichloride, boron tribromide, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, tellurium tetraiodide, tin tetrachloride, tin tetrabromide, aluminum trichloride, aluminum tribromide, antimony trichloride, antimony pentachloride, antimony tribromide, aluminum triiodide, gallium trichloride, gallium tribromide, gallium triiodide, indium trichloride, indium tribromide, indium triiodide, titanium tetrachloride, titanium tetrabromide, titanium tetraiodide, zinc dichioride, zinc dibromide, zinc diiodide, dimethylaluminum chloride, diethylaluminum chloride, dimethylaluminum bromide, diethylaluminum bromide, methylaluminum dichloride, ethylaluminum dichloride, methylaluminum dibromide, ethylaluminum dibromide, methylaluminum sesquichloride, ethylaluminum sesquichioride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, tributyltin bromide, or mixtures thereof.

22. The catalyst composition of claim 21, where said halogen-containing compound is dimethylaluminum chloride, diethylaluminum chloride, dimethylaluminum bromide, diethylaluminum bromide, methylaluminum dichioride, ethylaluminum dichioride, methylaluminum dibromide, ethylaluminum dibromide, methylaluminum sesquichioride, ethylaluminum sesquichioride, isobutylaluminum sesquichioride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, beuzylmagnesium chloride, trimethyltin chloride, trimethyltin bromide, triethyltin chloride, triethyltin bromide, di-t-butyltin dichioride, di-t-butyltin dibromide, dibutyltin dichioride, dibutyltin dibromide, tributyltin chloride, tributyltin bromide, or mixtures thereof.

23. The catalyst composition of claim 21, where said lanthanide compound is a lanthanide carboxylate, lanthanide organophosphate, lanthanide organophosphonate, lanthanide organophosphinate, lanthanide carbamate, lanthanide dithiocarbamate, lanthanide xanthate, lanthanide β-diketonate, lanthanide alkoxide or aryloxide, lanthanide pseudo-halide, organolanthanide compound, or mixture thereof.

24. The catalyst composition of claim 21, where said lanthanide compound is a neodymium oxychloride, neodymium oxybromide, or mixtures thereof.

25. The catalyst composition of claim 23, where said nickel-containing compound is a nickel carboxylate, nickel organophosphate, nickel organophosphonate, nickel organophosphlnate, nickel carbamate, nickel dithiocarbamate, nickel xanthate, nickel β-diketonate, nickel alkoxide or aryloxide, nickel pseudo-halide, organonickel compound, or mixture thereof.

26. The catalyst composition of claim 23, where said nickel-containing compound is a nickel chloride, nickel bromide, and nickel iodide, oxychioride, nickel oxybromide, or mixtures thereof.

27. The catalyst composition of claim 25, where said alkylating agent is an organoaluminum compound represented by the formula $AlR_nX_{3-n}$, where each R, which may be the same or different, is a mono-valent organic group that is attached to the aluminum atom via a carbon atom, where each X, which may be the same or different, is a hydrogen atom, a chlorine atom, bromine atom, iodine atom, a carboxylate group, an alkoxide group, or an aryloxide group, and where n is an integer of 1 to 3.

28. The catalyst composition of claim 25, where said alkylating agent is an aluminoxane.

29. The catalyst composition of claim 25, where said alkylating agent is an organomagnesium compound represented by the formula $MgR^2_2$, where each $R^2$, which may be the same or different, is a mono-valent organic group, with the proviso that the group is attached to the magnesium atom via a carbon atom.

30. The catalyst composition of claim 25, where said alkylating agent is an organomagnesium compound represented by the formula $R^3MgX$, where $R^3$ is a mono-valent organic group, with the proviso that the group is attached to the magnesium atom via a carbon atom, and X is a hydrogen atom, a chlorine atom, a bromine atom, an iodine atom, a carboxylate group, an alkoxide group, or an aryloxide group.

* * * * *